United States Patent [19]

Shimizu

[11] Patent Number: 4,730,686

[45] Date of Patent: Mar. 15, 1988

[54] MOTOR-DRIVEN POWER STEERING SYSTEM AND METHOD OF CONTROLLING SAME

[75] Inventor: Yasuo Shimizu, Saitama, Japan

[73] Assignee: Honda Giken Kogyo Kabushiki Kaisha, Tokyo, Japan

[21] Appl. No.: 35,676

[22] Filed: Apr. 7, 1987

[30] Foreign Application Priority Data

Apr. 8, 1986 [JP] Japan .................................. 61-80658

[51] Int. Cl.$^4$ ............................................. B62D 5/04
[52] U.S. Cl. ..................................... 180/79.1; 364/424
[58] Field of Search ............................. 180/79.1, 142; 74/388 PS; 364/424

[56] References Cited

U.S. PATENT DOCUMENTS

| 4,527,653 | 7/1985 | Agarwal et al. | 180/79.1 |
|---|---|---|---|
| 4,530,413 | 7/1985 | Buike et al. | 180/79.1 |
| 4,561,515 | 12/1985 | Hashimoto | 180/79.1 |
| 4,573,545 | 3/1986 | Kalns | 180/79.1 |
| 4,580,649 | 4/1986 | Ohe et al. | 180/79.1 |
| 4,629,952 | 8/1985 | Shimizu | 318/432 |
| 4,639,651 | 10/1985 | Shimizu | 318/432 |
| 4,651,840 | 2/1986 | Shimizu | 180/79.1 |
| 4,656,409 | 6/1987 | Shimizu | 318/689 |
| 4,657,103 | 5/1986 | Shimizu | 180/142 |
| 4,660,669 | 7/1987 | Shimizu | 180/79.1 |
| 4,671,371 | 10/1985 | Shimizu | 180/79.1 |
| 4,671,372 | 10/1985 | Shimizu | 180/79.1 |
| 4,688,655 | 8/1987 | Shimizu | 180/79.1 |

FOREIGN PATENT DOCUMENTS

| 3535503 | 5/1986 | Fed. Rep. of Germany | 180/142 |
|---|---|---|---|
| 58-105876 | 6/1983 | Japan | 180/142 |
| 60-18452 | 1/1985 | Japan | 180/79.1 |
| 2135642 | 9/1984 | United Kingdom | 180/79.1 |
| 2167025 | 5/1986 | United Kingdom | 180/79.1 |

Primary Examiner—John A. Pekar
Attorney, Agent, or Firm—Armstrong, Nikaido, Marmelstein & Kubovcik

[57] ABSTRACT

The maximum rotational speed of an electric motor upon returning motion of a steering mechanism to its neutral position is limited below a preset value dependent on the speed of travel of an automotive vehicle incorporating the steering mechanism. A motor-driven power steering system comprises the steering mechanism, the electric motor for applying assistive power to the steering mechanism, steering torque detecting means for producing signals representative of a steering torque, steering rotation detecting means for producing signals indicative of steering rotation, and a control unit. The control unit includes returning motion detecting means for detecting returning motion of the steering mechanism to its neutral position, vehicle speed detecting means for producing a signal representing the speed of travel of the automotive vehicle, correcting means for limiting a signal indicating the speed of steering rotation below a preset value based on the signal from the vehicle speed detecting means when returning motion of the steering mechanism is detected, and motor control means for determining a motor control signal based on the signals from the steering torque detecting means and the signal indicating the speed of steering rotation, or the signals from the steering torque detecting means and the limited signal from the correcting means when returning motion of the steering mechanism is detected, and for controlling the electric motor with the determined motor control signal.

6 Claims, 9 Drawing Figures

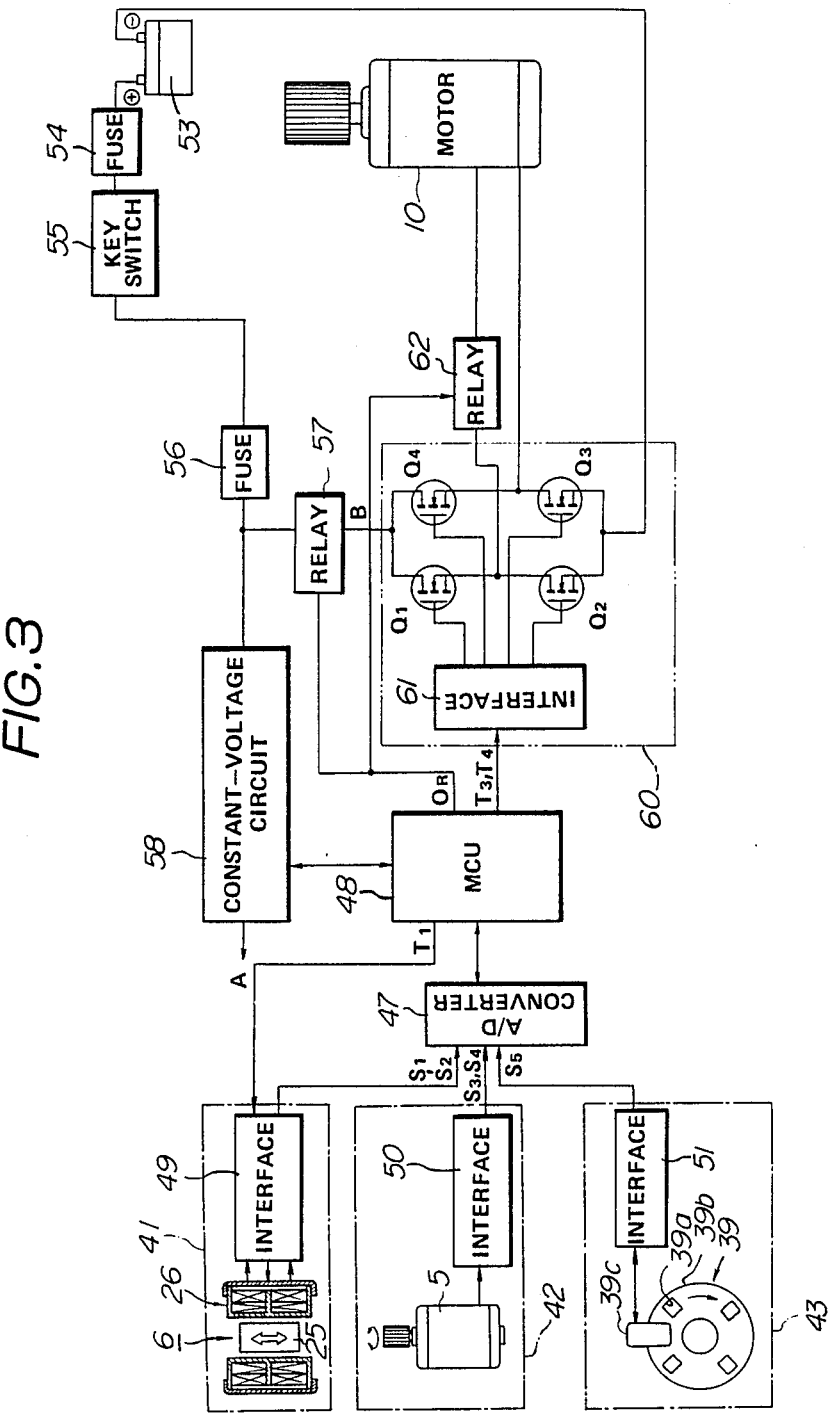

MOTOR-DRIVEN POWER STEERING SYSTEM AND METHOD OF CONTROLLING SAME

BACKGROUND OF THE INVENTION

1. Field of the Invention

The present invention relates to a motor-driven power steering system which employs an electric motor for generating assistive steering power that is applied to a steering mechanism to reduce a steering force to be manually applied, and a method of controlling such a motor-driven power steering system.

2. Description of the Relevant Art

One conventional motor-driven power steering system for use on an automotive vehicle is disclosed in Japanese Laid-Open patent publication No. 59-130780 (corresponding to British patent application No. 2 135 642A), for example. In the disclosed power steering system, the steering torque applied by a steering wheel to a steering mechanism is detected by a steering torque detecting means, and the speed of travel of the automotive vehicle is detected by a vehicle speed detecting means. Based on the detected signals, the electric motor for producing assistive steering power is controlled to produce an assistive steering torque commensurate with the vehicle speed.

Generally, an electric motor produces a low output torque and rotates at a high speed, whereas the assistive power source for a motor-driven power steering system is required to produce a high output torque and rotate at a low speed. To meet such a torque/speed requirement, the above conventional power steering system employs a gear train as a speed reducer for applying the motor power therethrough to the steering mechanism in reducing the manually imposed steering force.

However, the conventional motor-driven power steering system does not have a means for detecting the steering speed and a means for detecting returning motion of the steering mechanism after the steering wheel has been turned while the vehicle is running. Since the motor is controlled without signals from such detecting means, the stability of the vehicle as it is running at a high speed is rather poor when the steering mechanism returns to its neutral position.

More specifically, when the steering mechanism returns to the neutral position, it is forcibly moved back to the neutral position under reactive forces from the tires due primarily to the caster trail. Inasmuch the speed reducer is rotated from its output side at this time, the motor is rotated at an increased speed, and the moment of inertia of the motor in the steering mechanism is of a very large value as it is proportional to the square of the speed reduction ratio of the speed reducer. While the vehicle is running at a low speed and the reactive forces from the tires are small, the inertial moment of the motor assists in quickly returning the steering mechanism which is therefore automotically moved back rapidly while being released from the driver's hands. At high speeds of travel, however, the reactive forces of the tires are so large that the steering mechanism may move too far beyond its neutral position and then back again. Such reciprocating motion is repeated until the neutral position is reached. Therefore, the time required for the steering mechanism to settle to the neutral position is relatively long, making the vehicle unstable while the steering mechanism is returning during high-speed travel of the vehicle.

SUMMARY OF THE INVENTION

It is an object of the present invention to control a steering mechanism so that the speed of returning motion thereof to its neutral position will not exceed an optimum value dependent on the speed of travel of an automotive vehicle incorporating the steering mechanism, by limiting the maximum speed of rotation of an electric motor in the steering mechanism while the steering mechanism is returning to the neutral position, below a preset value which decreases with an increase in the speed of travel of the vehicle, whereby the ability of the steering mechanism to return to the neutral position can be increased at low-speed travel of the vehicle and the stability of the vehicle upon returning motion of the steering mechainsm is increased during high-speed travel of the vehicle.

According to the present invention, there is provided a motor-driven power steering mechanism for a vehicle, comprising a steering mechanism adapted to operatively interconnect a steering wheel and steerable wheels, an electric motor for applying assistive power to the steering mechanism, steering torque detecting means for detecting a steering torque applied to the steering mechanism and producing a signal representative of the direction and magnitude of the steering torque, steering rotation detecting means for detecting steering rotation of the steering mechanism and producing a signal indicative of the direction and speed of the steering rotation, returning motion detecting means for detecting returning motion of the steering mechanism to a neutral position thereof, vehicle speed detecting means for detecting the speed of travel of the vehicle and producing a signal representing the speed of travel of the vehicle, correcting means for limiting a signal corresponding to the speed of steering rotation from the steering rotation detecting means below a preset value based on the signal from the vehicle speed detecting means, when returning motion of the steering mechanism is detected by the returning motion detecting means, and motor control means for determining a motor control signal based on the signals from the steering torque detecting means and the signal from the steering rotation detecting means including the limited signal from the correcting means, and for controlling the electric motor with the determined motor control signal.

The above and further objects, details and advantages of the present invention will become apparent from the following detailed description of a preferred embodiment thereof, when read in conjunction with the accompanying drawings.

BRIEF DESCRIPTION OF THE DRAWINGS

FIG. 3 is a block diagram of a control unit of the motor-driven power steering system;

DETAILED DESCRIPTION OF THE PREFERRED EMBODIMENT

Figure 1:
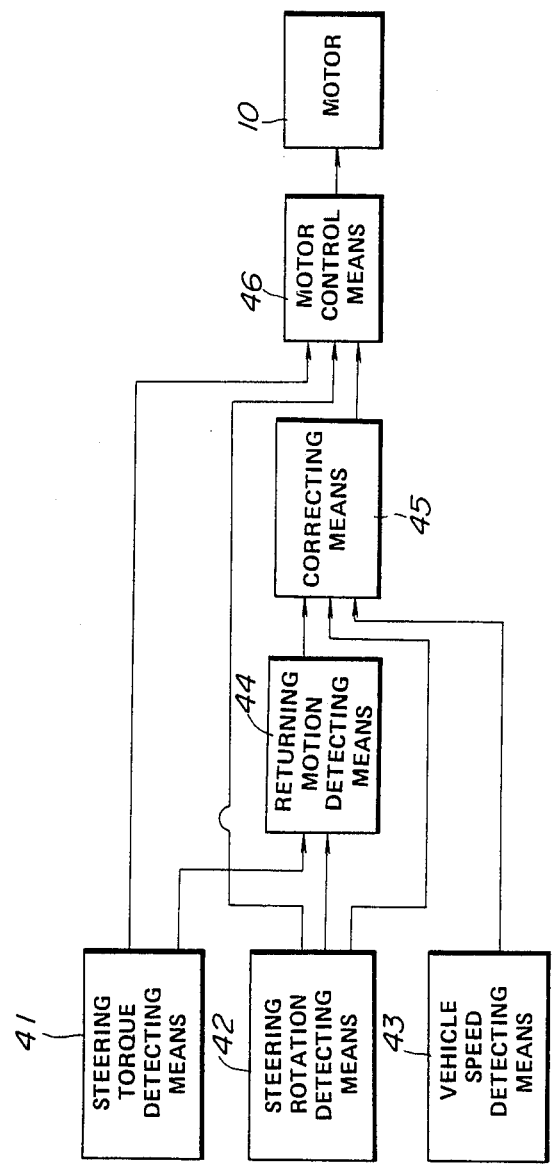
FIG. 1 is a block diagram of a control system of a motor-driven power steering system of the present invention.

In FIG. 1, a signal from a steering torque detecting means 41 and a signal from a steering rotation detecting means 42 are applied to a returning motion detecting means 44, which detects returning motion of a steering mechanism based on the applied signals. In response to an output signal from a vehicle speed detecting means 43, a correcting means 45 limits an output signal from the steering rotation detecting means 42 below a preset value which decreases as the speed of travel of an automotive vehicle incorporating the steering mechanism, when returning motion of the steering mechanism is detected by the returning motion detecting means 44. A motor control means 46 determines a motor control signal based on the steering torque detecting means 41 and the speed detecting means 43 and also on the output signals from the steering torque detecting means 41 and the correcting means 45, and controls the operation of a motor 10 with the determined motor control signal.

Therefore, when the steering mechanism is moved back to its neutral position, the output signal from the steering rotation detecting means 42 is limited dependent on the vehicle speed signal by the correcting means 45. In medium and high speed ranges, the speed of returning motion of the steering mechanism is limited dependent on the vehicle speed. Accordingly, the ability of the steering mechanism to return to its neutral position is maintained during low-speed travel of the vehicle, whereas the time required for the steering mechanism to return to the neutral position is shortened during high-speed vehicle travel, resulting in increased vehicle stability upon returning action of the steering mechanism.

Figure 2:
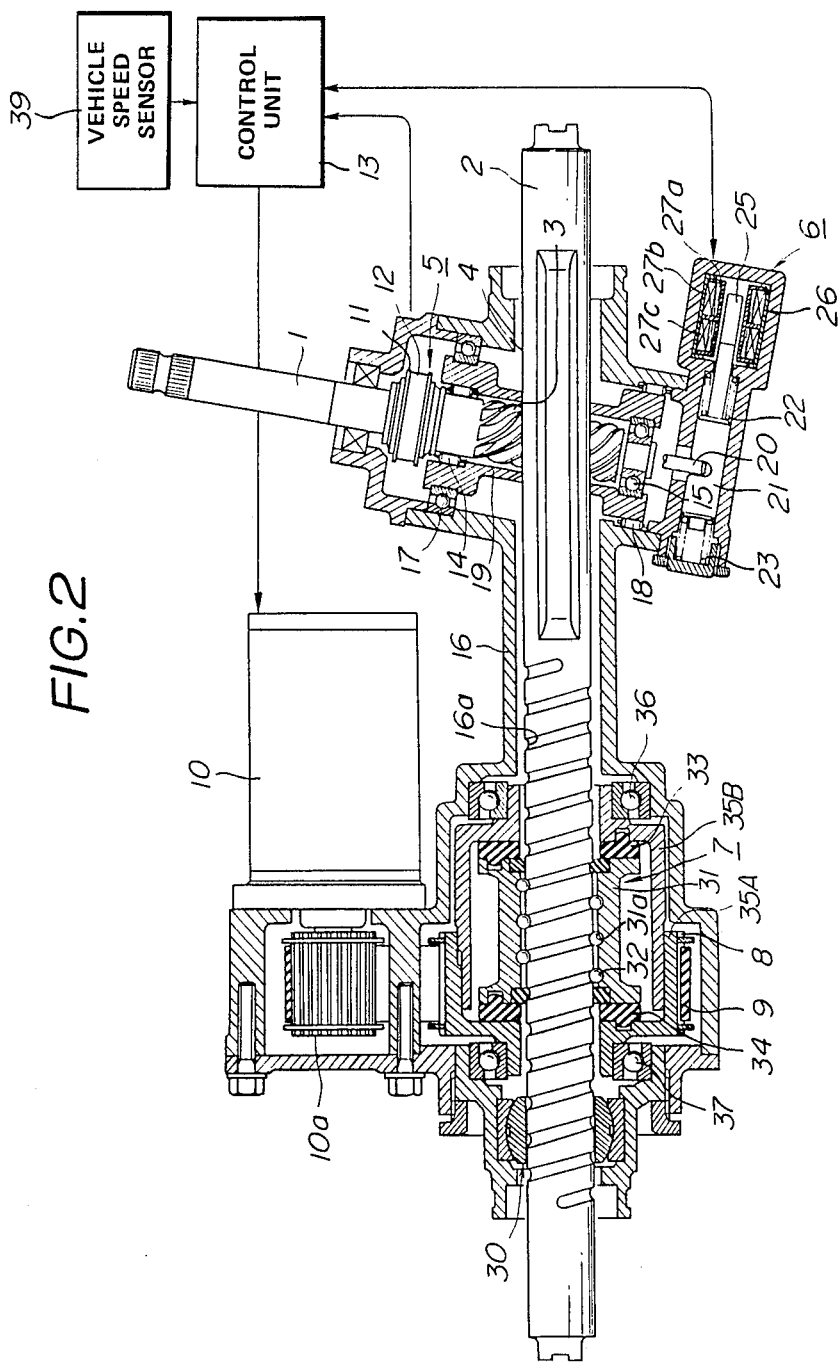
FIG. 2 is a longitudinal cross-sectional view, partly in block form, of the motor-driven power steering system of the present invention.

As illustrated in FIG. 2, a pinion gear 3 integrally defined on the lower end of a pinion shaft 1 is held in mesh with rack teeth 4 on the back of a rack shaft 2 within a housing 16. Therefore, turning movement of the pinion shaft 1 about its own axis is converted to axial movement of the rack shaft 2. The pinion shaft 1 is coupled to a steering wheel through a universal joint and a steering shaft (not shown). The rack shaft 2 has opposite ends coupled by tie rods (not shown) to knuckles on which steerable road wheels (not shown) are rotatably supported. The steering mechanism of such a construction converts turning movement of the steering wheel to swinging movement of the steerable road wheels.

On the end portion of the rack shaft 2 remote from the rack teeth 4, there are mounted a ball screw mechanism 7, a pulley case 35A, a pulley case 35B, a larger-diameter toothed pulley 8 integral with the outer periphery of the pulley case 35A, an electric motor 10 having an output shaft with a smaller-diameter toothed pulley 10a mounted thereon, and a timing belt 9 trained around the pulleys 8, 10a. Rotation of the motor 10 is transmitted through the pulley 10a, the timing belt 9, and the pulley 8 to the ball screw mechanism 7 while the speed of rotation is being reduced, and is converted by the ball screw mechanism 7 to axial movement of the rack shaft 2.

A steering rotation sensor 5 and a steering torque sensor 6 are disposed around the pinion shaft 1.

More specifically, the steering rotation sensor 5 comprises a DC tachogenerator (not shown) disposed behind the back of the pinion shaft 1, a smaller-diameter toothed pulley integral with the rotor of the DC tachogenerator, a larger-diameter toothed pulley 11 integral with the pinion shaft 1, and a timing belt 12 trained around the smaller-and larger-diameter pulleys. The DC tachogenerator generates a direct current having polarities (+, −) dependent on the direction of rotation of the pinion shaft 1 at a voltage commensurate with the speed of rotation thereof, the output current being applied to a control unit 13.

A pinion holder 19 is disposed around the pinion gear 3 which is rotatably supported by bearings 14, 15 in the pinion holder 19. The pinion holder 19 is rotatably supported by bearings 17, 18 in the housing 16, the pinion holder 19 being disposed eccentrically with respect to the axis of rotation of the pinion gear 3. The pinion holder 19 has a pin 20 projecting downwardly from the lower end thereof in eccentric relation to the axis of rotation of the pinion holder 19. The steering torque sensor 6 comprises a piston 21 axially movable by the pin 20 to convert turning movement of the pinion holder 19 to axial displacement thereof, springs 22, 23 for limiting the axial displacement of the piston 21, and a differential transformer 26 for converting the axial displacement of the piston 21 to an electric signal. When a load on the rack 2 is large, the pinion gear 3 is prevented from turning by meshing engagement between the pinion gear 3 and the rack shaft 4, and the pinion holder 19 is rotated about its own axis. Such rotation of the pinion holder 19 is converted by the pin 20 as it revolves around the axis of rotation of the pinion holder 19, to axial displacement of the piston 21. The pinion gear 3 is turned until it counterbalances the reactive forces of the springs 22, 23, and the pinion holder 19 is displaced to an extent commensurate with the steering torque. The displacement of the piston 21 is detected by the differential transformer 26.

The differential transformer 26 comprises a ferromagnetic iron core 25 attached to one end of the piston 21, a primary winding 27a, and secondary windings 27b, 27c. An AC voltage is applied by the control unit 13 to the primary winding 27a, and voltages with their amplitudes diferentially variable dependent on the displacement of the iron core 25 from an electrically neutral point are induced across the secondary windings 27b, 27c. The output voltages from the secondary windings 27b, 27c are applied to the control unit 13. Based on these output voltages, the magnitude and direction of the steering torque are detected through an interface 49 (FIG. 3), described later on.

The end portion of the rack shaft 2 remote from the pinion gear 3 is swingably and axially movably supported by a spherical bearing 30 in the housing 16. The rack shaft 2 has a ball screw groove 16a defined in the outer peripheral surface thereof. A ball nut 31 with a similar ball screw groove 31a defined in the inner peripheral surface thereof is fitted over the rack shaft 2 around the ball screw groove 16a. A plurality of balls 32 ride in the ball screw grooves 16a, 31a for rolling movement therethrough and circulation through a circulation passage defined in the ball nut 31. Thus, turning movement of the ball nut 31 is smoothly converted through the balls 32 to axial movement of the rack shaft 2. The ball nut 31 is axially sandwiched between the pulley cases 35A, 35B with resilient members 33, 34 interposed therebetween. The pulley cases 35A, 35B are rotatably supported in the housing 16 by means of angular contact bearings 36, 37. The larger-diameter pulley 8 is integrally disposed on the outer periphery of the pulley case 35A. Rotation of the motor 10 is transmitted to the larger-diameter pulley 8 via the timing belt 9 trained around the pulleys 10a, 8. The motor 10 is controlled by the control unit 13 which is supplied with a vehicle speed signal from a vehicle speed sensor 39.

The control unit 13 will be described in detail with reference to FIG. 3.

The control unit 13 includes an A/D converter 47 and a microcomputer unit 48 supplied with detected signals S1 through S5 from the steering torque detecting means 41, the steering rotation detecting means 42, and the vehicle speed detecting means 43 through the A/D converter 47.

The steering torque detecting means 41 comprises a steering torque sensor 6 and the interface 49 which frequency-divides reference clock pulses T1 from the microcomputer unit 48 into an AC signal to be supplied to the primary winding 27a of the differential transformer 26. The interface 49 also rectifies and smooths the outputs from the secondary windings 27b, 27c of the differential transformer 26 and issues steering torque signals S1, S2 which are indicative of the direction and magnitude, respectively, of the steering torque applied to the steering wheel.

The steering rotation detecting means 42 comprises a steering rotation sensor 5 and an interface 50 which converts output signals from the DC generator of the steering rotation sensor 5 to absolute values and amplifies them for thereby issuing steering rotation signals S3, S4 representing the direction and speed, respectively, of rotation of the steering mechanism.

The vehicle speed detecting means 43 comprises a vehicle speed sensor 39 including a rotatable disc 39b having slits 39a and rotatable by and with a speedometer cable (not shown) and a photocoupler 39c for detecting light that has passed through the slits 39a, and an interface 51 for supplying electric power to the photocoupler 39c and converting a pulsed signal from the photocoupler 39c to a DC voltage proportional to the vehicle speed, which is issued as a vehicle speed signal S5.

The microcomputer unit 48 comprises an I/O port, memories, a processor, a controller, registers, and a clock pulse generator, and issues motor control signals based on clock pulses generated. The microcomputer unit 48 and other circuit components are energized by a power source circuit comprising a vehicle-mounted battery 53, a fuse 54 connected to the positive terminal of the battery 53, a key or ignition switch 55 connected to the fuse 54, a fuse 56 connected to the key switch 55, a relay circuit 57 connected to the output of the fuse 56, and a constant-voltage circuit 58 connected to the fuse 56. Electric power is supplied from a B output terminal of the relay circuit 57 to a motor driver circuit (motor driving means) 60 (described later). The constant-voltage circuit 58 has an A output terminal for supplying electric power to the microcomputer unit 48, the interfaces 49, 50, 51, and other circuits. When the key switch 55 is closed, the microcomputer unit 48 is operated according to a predetermined program stored in the memory to convert the detected signals S1 through S5 to digital signals in the A/D converter 47, process the digital signals according to the program, and applies the motor control signals T3, T4 to the motor driver circuit 60 for controlling the operation of the motor 10.

Figure 5:
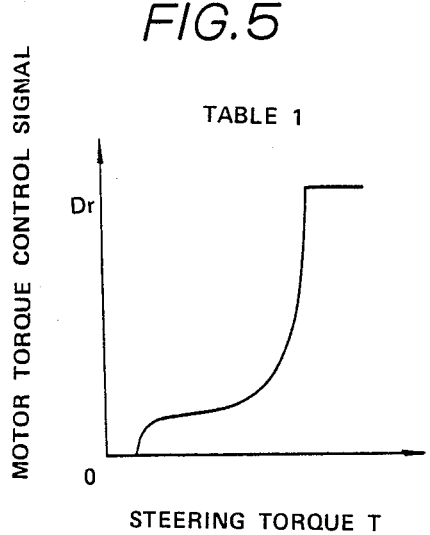
FIGS. 5, 6, 7 and 8 are graphs showing the contents of a memory in a microcomputer in the control unit.

The returning motion detecting means 44 and the correcting means 45 shown in FIG. 5 are implemented by the microcomputer unit 48, and the motor control means 46 is implemented by the microcomputer unit 48 and the motor driver circuit 60.

The motor driver circuit 60 is constructed of a bridge circuit of field-effect transistors (FETs) Q1, Q2, Q3, Q4 and an interface 61 for driving the bridge circuit with the control signals T3, T4 from the microcomputer unit 48. The FETs Q1, Q4 have drain terminals connected to the B terminal of the relay circuit 57, and source terminals connected to the respective drain terminals of the FETs Q2, Q3. The source terminals of the FETs Q2, Q3 are coupled to the negative terminal of the battery 53. The gate terminals of the FETs Q1, Q2, Q3, Q4 are connected to the output terminals of the interface 61. The bridge circuit has output terminals, i.e., the source terminals of the FETs Q1, Q4, connected to the armature winding of the motor 10. The interface 61 turns on the FET Q1, for example, and simultaneously makes the FET Q3, for example, drivable in response to the direction control signal T3 from the microcomputer unit 48, and drives the FET Q3 based on the drive signal T4 which is in the form of a PWM signal. Alternatively, the interface 61 turns on the FET Q4 and makes the FET Q2 drivable in response to the direction control signal T3, and drives the FET Q2 based on the drive signal T4. Therefore, the motor driver circuit 60 turns on the FET Q1 and PWM-drives the FET Q3, or turns on the FET Q4 and PWM-drives the FET Q2 for controlling the direction of rotation of the motor 10 and the power (rotational speed and torque) thereof.

Another relay circuit 62 is connected between the bridge circuit and the motor 10. The relay circuits 57, 62 are operated by a relay control signal OR from the microcomputer unit 48 in the event that the control unit 13 is subjected to a failure. When the relay circuits 57, 62 are operated by the relay control signal OR, the power supply from the B terminal to the motor driver 60 is cut off, and the motor 10 is electrically disconnected from the motor driver circuit 60.

Figure 4A:
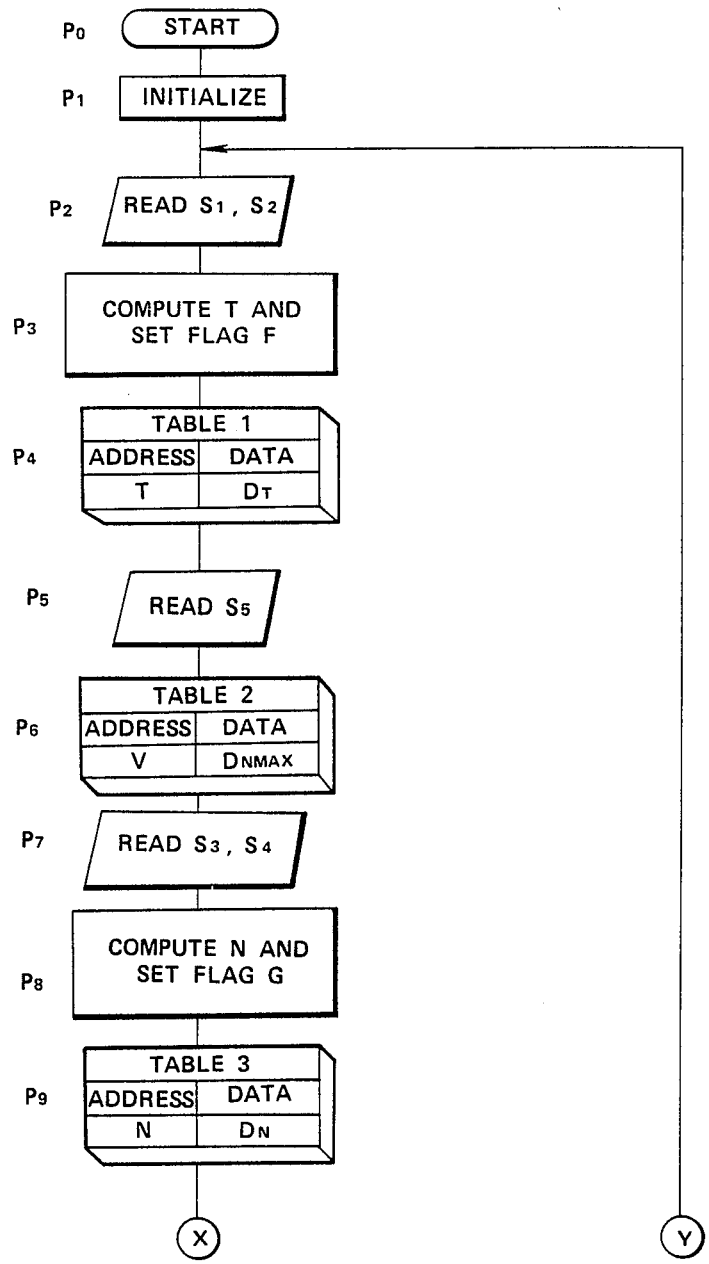
FIGS. 4a and 4b are a flowchart of a control sequence of the control unit.
Figure 4B:
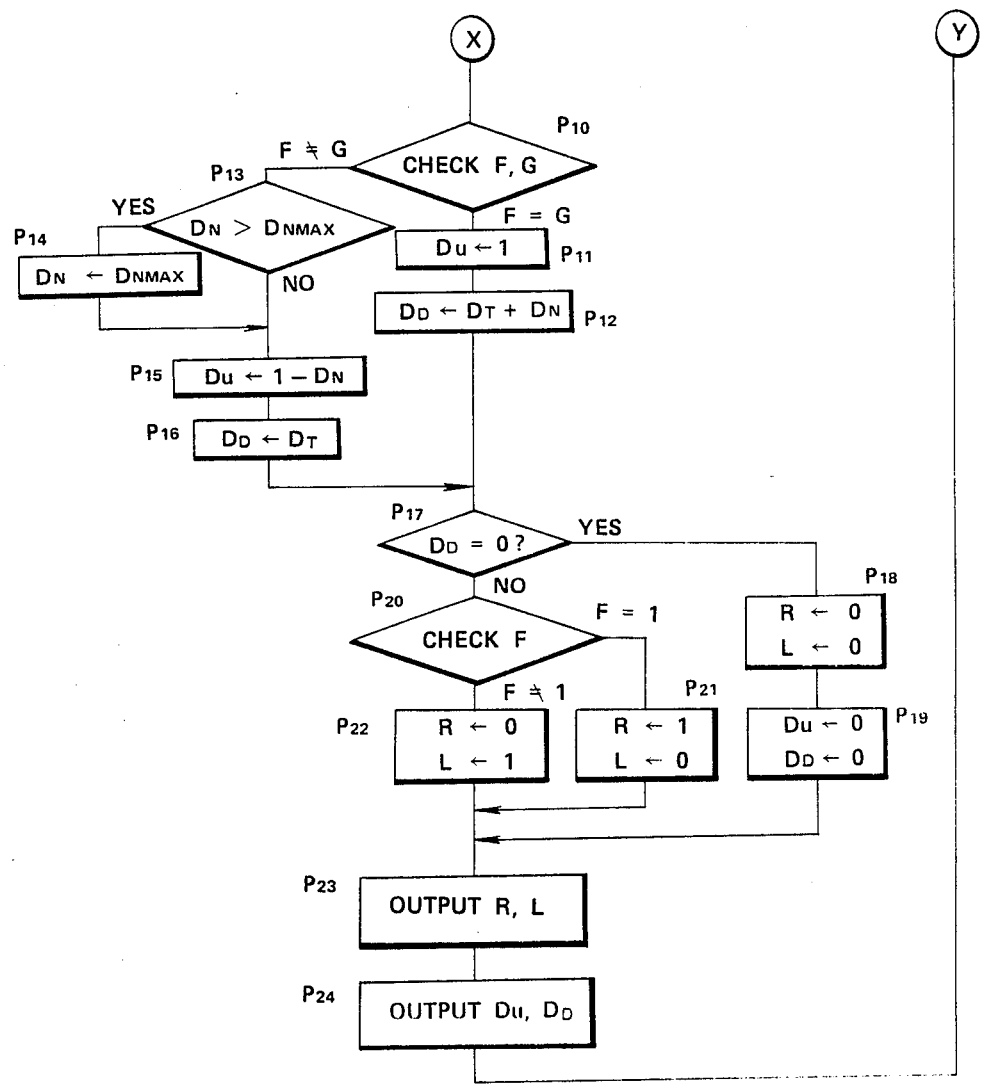

Operation of the power steering system will be described below with reference to FIGS. 4a and 4b which show a control sequence of the control unit 13.

When the key switch 55 is turned on, the microcomputer unit 48 and other circuits are energized to start the control process at a step P0. In the microcomputer unit 48, the I/O port is set and the data in the registers and RAM are cleared for initialization in a step P1. Then, the steering torque signals S1, S2 are read in a step P2. In a next step P3, the direction and magnitude of the steering torque are computed from the detected signals S1, S2, and a torque direction flag F indicative of the direction in which the torque is applied is set and the magnitude of the torque is converted to an absolute value T which is stored. Then, a data item is read out of a memory table 1 by being addressed by the absolute value T of the steering torque in a step P4. The table 1 stores motor torque control signals $D_T$ corresponding to absolute values T of the steering torque as shown in FIG. 5.

Figure 6:
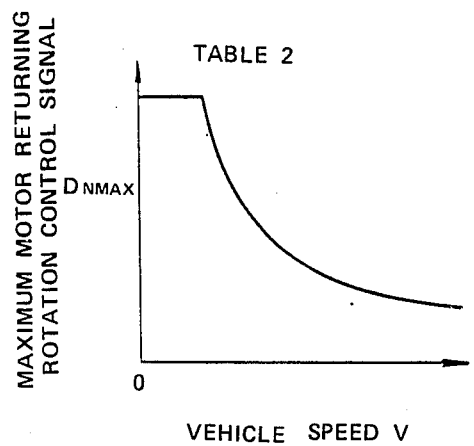
Figure 7:
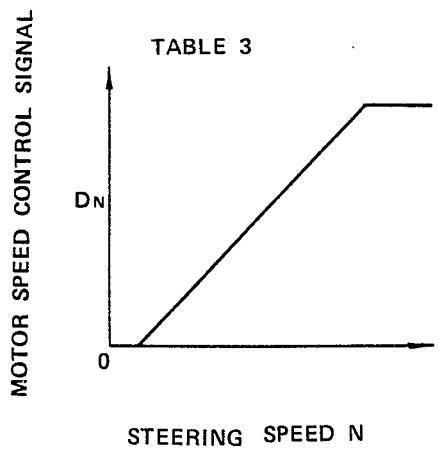

The vehicle speed signal S5 is read in a step P5, and a data item is read out of a memory table 2 by being addressed by a vehicle speed V corresponding to the vehicle speed signal S5 in a step P6. As illustrated in FIG. 6, the table 2 stores maximum values $D_{NMAX}$ of a returning rotation control signal for the motor 10 which correspond to vehicle speeds V. The maximum value $D_{NMAX}$ is a duty ratio for determining the maximum rotational speed for the motor, i.e., the upper speed limit, when the steering mechanism is to return to its neutral position. This maximum value is selected to be of a certain level when the vehicle speed is in a prescribed range, and to be decreasing gradually in a higher speed range. Therefore, as the vehicle speed increases, the maximum rotational speed of the motor 10 is limited. Then, the steering rotation signals S3, S4 are read in a step P7. The direction and speed of steering rotation are computed from these signals S3, S4, and a direction flag G indicative of the direction of steering rotation is set and the magnitude of the speed of steering rotation is converted to an absolute value N which is stored in a step P8. In a next step P9, a data item is read out of a memory table 3 by being addressed by the absolute value N of the steering rotational speed. As shown in FIG. 7, the table 3 stores motor speed control signals $D_N$ corresponding to absolute values N of the steering speed.

A step P10 then compares the flags F, G. If the signs of the flags F, G are the same, it is determined that the steering mechanism is being operated to steer the vehicle, and $D_U$ is set to "1" in a step P11, which is followed by a step P12 in which $D_D$ is set to $D_T + D_N$. If the signs of the flags F, G are different from each other, it is determined that the steering mechanism is returning, and a step P13 ascertains whether $D_N$ is larger than $D_{NMAX}$. If not, then $D_U$ is set to $1 - D_N$ in a step P15 and $D_D$ is set to $D_T$ in a step P16. If $D_N$ is larger than $D_{NMAX}$ in the step P13, i.e., if required $D_N$ is in excess of $D_{NMAX}$ that determines the maximum rotational speed of the motor 10, then $D_N$ is replaced with $D_{NMAX}$ in a step P14 followed by the step P15 in which $D_U$ is set to $1 - D_N$ that has been replaced with $D_{NMAX}$.

$D_U$ and $D_D$ referred to above are duty ratios which determine a PWM signal representative of the torque signal T4. $D_U$ is applied to one of a set of FETs, whereas $D_D$ is applied to the other FET. For example, assuming that one FET set comprises Q1, Q3 and the other FET set comprises Q2, Q4, $D_U$ is given to Q1 or Q2, and $D_D$ is given to Q3 or Q4.

Control goes from the step P16 to a step P17 which ascertains whether $D_D = 0$ or not. If $D_D = 0$, it is judged that no steering torque is applied to the steering system, and control goes to a step P18 in which R and L are set to 0, and then a step P19 in which $D_U$ and $D_D$ are set to 0. If $D_D$ is not 0 in the step P17, it is determined that a steering torque is applied to the steering system, and control proceeds to a step P20 which checks the sign flag F. If F=1, then R is set to 0 and L is set to 0 in a step P21. if F is not 1, then R is set to 0 and L is set to 1 in a step P22. R and L are signs indicative of the direction signal T3. For example, R indicates clockwise rotation of the steering wheel, whereas L indicates counterclockwise rotation thereo.

Then, R and L are issued in a step P23, and $D_U$ and $D_D$ are issued in a step P24, from which controls goes back to the step P2. The above loop is thereafter repeated.

Figure 8:
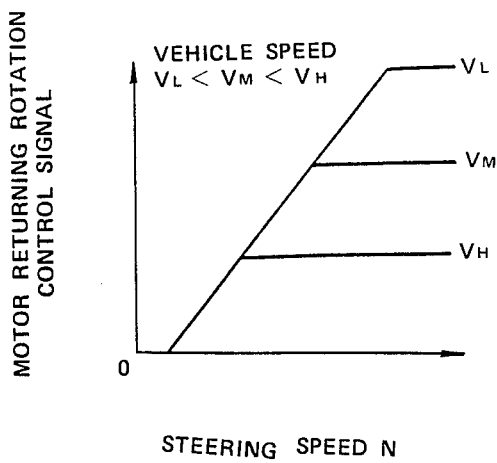

With the arrangement of the present invention, upon returning motion of the steering mechanism, the rotation control signal $D_N$ for the motor is limited as the vehicle speed goes higher, and hence the maximum rotational speed of the motor 10 is limited. For example, a low vehicle speed, a medium vehicle speed, and a high vehicle speed are indicated respectively by $V_L$, $V_M$, and $V_H$, as shown in FIG. 8. As the vehicle speed rises to the medium and high vehicle speeds $V_M$, $V_H$, the returning rotation control signal for the motor 10 is of small constant values when the steering rotation speed exceeds certain values as shown in FIG. 8. Consequently, while the vehicle is running in a low speed range, the speed of returning motion of the steering mechanism is kept at a high level. As the vehicle speed enters a higher speed range, the speed of returning motion of the steering mechanism is limited to a lower level. When the steering mechanism returns to its neutral point while the vehicle is running in a medium or high speed range, therefore, any oscillating movement thereof across the neutral position due to large reactive forces from the tires is eliminated in a short period of time. The ability of the steering mechanism to move stably back to the neutral point is thus increased.

In the illustrated embodiment, returning motion of the steering mechanism is detected from the steering rotation signal and the steering torque signal. However, rotation of the motor may be detected, and a signal indicative of such detected motor rotation and the steering torque signal may be employed to detect returning motion of the steering mechanism.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

I claim:
1. A motor-driven power steering mechanism for a vehicle, comprising:
   a steering mechanism adapted to operatively interconnect a steering wheel and steerable wheels;
   an electric motor for applying assistive power to said steering mechanism;
   steering torque detecting means for detecting a steering torque applied to said steering mechanism and producing a signal representative of the direction and magnitude of the steering torque;
   steering rotation detecting means for detecting steering rotation of said steering mechanism and producing a signal indicative of the direction and speed of the steering rotation;
   returning motion detecting means for detecting returning motion of said steering mechanism to a neutral position thereof;
   vehicle speed detecting means for detecting the speed of travel of the vehicle and producing a signal representing the speed of travel of the vehicle;
   correcting means for limiting a signal corresponding to the speed of steering rotation from said steering rotation detecting means below a preset value based on the signal from said vehicle speed detecting means, when returning motion of said steering mechanism is detected by said returning motion detecting means; and
   motor control means for determining a motor control signal based on the signal from said steering torque detecting means, and the signal from said steering rotating detecting means including the limited signal from said correcting means, and for controlling said electric motor with said determined motor control signal.

2. A motor-driven power steering system according to claim 1, wherein said returning motion detecting means detects returning motion of said steering mechanism to the neutral position by comparing the signal indicative of the direction of the steering torque from said steering torque detecting means and the signal indicative of the direction of steering rotation from said steering rotation detecting means.

3. A motor-driven power steering system according to claim 1, wherein said preset value below which the signal corresponding to the speed of steering rotation from said steering rotation detecting means is limited is reduced as the magnitude of the signal indicative of the speed of travel of the vehicle from said vehicle speed detecting means is increased.

4. A method of controlling a motor-driven power steering system having a steering mechanism and an electric motor for applying assistive power to the steering mechanism in a vehicle, said method comprising the steps of:

detecting a steering torque applied to the steering mechanism and producing a signal representative of the direction and magnitude of the steering torque;

detecting steering rotation of the steering mechanism and producing a signal indicative of the direction and speed of the steering rotation;

detecting returning motion of the steering mechanism to a neutral position thereof;

detecting the speed of travel of the vehicle and producing a signal representing the speed of travel of the vehicle;

limiting a signal corresponding to the speed of steering rotation below a preset value based on the signal representing the speed of travel of the vehicle, when returning motion of the steering mechanism is detected; and determining a motor control signal based on the signal indicative of the direction and magnitude of the steering torque, and the signal indicative of the direction and speed of the steering rotation including the limited signal, and controlling the electric motor with said determined motor control signal.

5. A method according to claim 4, wherein the step of detecting returning motion of the steering mechanism includes the step of comparing a signal indicative of the direction of the steering torque from steering torque detecting means and a signal indicative of the direction of steering rotation from steering rotation detecting means.

6. A method according to claim 4, wherein said preset value below which the signal corresponding to the speed of steering rotation is limited is reduced as the magnitude of the signal indicative of the speed of travel of the vehicle is increased.

* * * * *